Sept. 12, 1933.    J. G. DE A. YRARRÁZAVAL    1,926,613
RELOADING DEVICE
Filed April 11, 1930    2 Sheets-Sheet 1
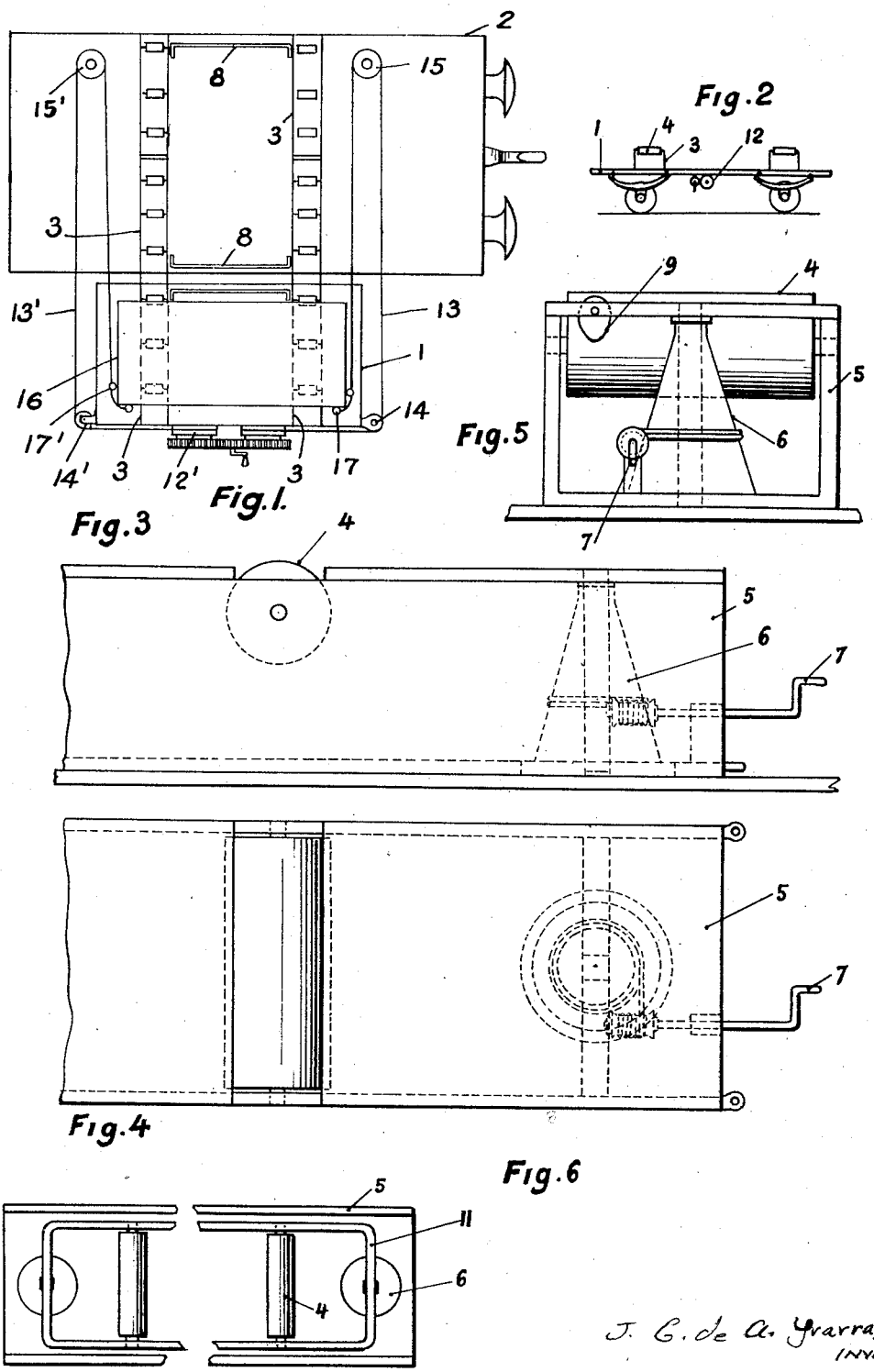

Sept. 12, 1933.  J. G. DE A. YRARRÁZAVAL  1,926,613
RELOADING DEVICE
Filed April 11, 1930   2 Sheets-Sheet 2

J. G. de A. Yrarrazaval
INVENTOR

Patented Sept. 12, 1933

1,926,613

UNITED STATES PATENT OFFICE 1,926,613

RELOADING DEVICE

Jean Gonzalez de Andia Yrarrázaval, Paris, France

Application April 11, 1930, Serial No. 443,577, and in France April 22, 1929

1 Claim. (Cl. 193—35)

My invention has for its object a device allowing an easy and speedy reloading of goods such as cases and the like from one vehicle platform onto another or onto a stationary platform or again from a stationary platform on to a vehicle platform with a minimum expenditure in handicraft. This problem is of interest chiefly for railroad transportation, when it is desired to make goods pass from a lorry, trailer or tractor platform on to a railroad truck and reversely.

My improved device shows the advantage of requiring only a very slight modification in the vehicle platforms if it is to be secured permanently on this vehicle or even none if it is removably secured thereto. Its size and weight are small whereby it may be transported with the goods themselves for use in those parts where it is not in common use. Lastly it requires only very little handicraft owing to the fact that it allows, in combination with suitable hauling means all loadings and reloadings to be effected by a single man.

My invention has for its primary object a method for the transfer of goods between two vehicles say a lorry and a railroad truck or between a vehicle and a stationary platform which consists in causing the goods of any kind whatever to pass from one support (vehicle or goods platform) on to another through their direct sliding i. e. without the interposition of rollers, sleds or the like over horizontal slideways provided on the supports.

These slideways, alined or not and removable or not are secured perpendicularly to the axis of the vehicle and are provided, in order to allow the levelling required for transferring the goods from one slideway to the other or the passing over the racks on the trucks, with a raising device, such as a jack system adapted to raise the slideways to the desired level whilst retaining their horizontal position.

For an easy securing of the goods in view of a somewhat lengthy travel and for preventing the shocks from damaging the slideway, the latter is preferably adapted to collapse after loading whereby the goods are allowed to move downwards on to supports to which they may be easily secured. For instance the rollers forming the slideway may be borne by a series of pivoting uprights which may be lowered to a varying extent through the agency of suitable control means so as to allow the goods to rest on wooden supports, removable or not. The supports may be disposed as desired either on the inside or on the outside of the two elementary transversal slideways supporting a row of goods and their upper surface must be slightly lower than that of the rollers in their upper position.

In a preferred form of execution the rollers are borne by uprights pivotally secured to the cross-bars of the vehicle itself, the rollers collapsing inside recesses provided in the platform which acts in lieu of the above mentioned supports.

The transversal slideways mentioned hereinabove may be completed by longitudinal slideways allowing endwise loading and reloading. Similarly the elementary slideways, when removable may be disposed at suitable points of the vehicle platform or loading stage, the distance between two cooperating elementary slideways being chosen according to the requirements of operation and to the shape and size of the goods.

I have described hereinbelow by way of example several forms of execution of my invention with reference to accompanying drawings.

Fig. 1 is a general diagrammatic view from above of the slideways and of the vehicle carrying same.

Fig. 2 is a corresponding side view.

Fig. 3 is a side view of a modification of the slideway.

Figs. 4 and 5 are respectively a plan and an end view of same.

Fig. 6 is a diagrammatic showing of a further modification.

Figure 7:
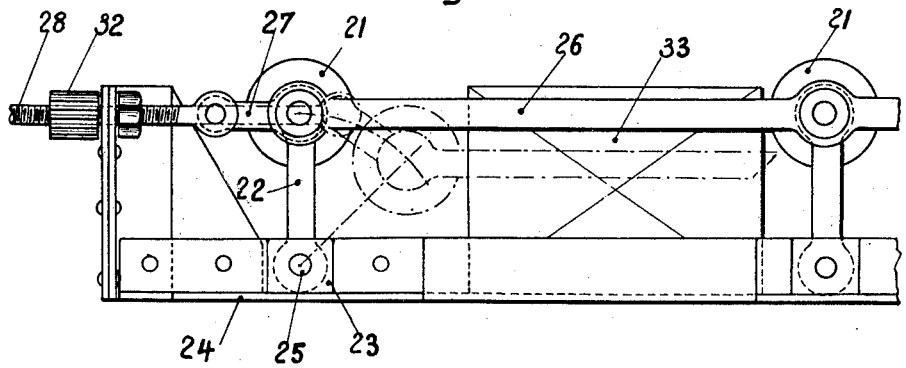
Fig. 7 is a diagrammatic side view of a slideway adapted to collapse for allowing the goods to rest on their supports.

Referring to Fig. 1 the vehicle 1 shown as a trailer is supposed to be unloading on to a railroad truck 2.

In view of this, the vehicle 1 and the truck platform 2 carry a suitable number of rails or supports 3 according to the amount of goods to be transferred. These supports carry transversely disposed rollers 4 projecting above said supports. The latter may be constituted by a metal frame 5 for instance of duralumin (Figs. 3, 4, 5). It is provided at each end with a lifting jack 6 controlled by a crank 7 for raising and lowering it. The reason for this arrangement resides in that the platforms from one of which the goods are to be transferred to the other are rarely level one with the other. The jacks may be actuated independently through separate cranks as shown or else the two jacks of one supporting rail may be actuated by a common crank. The cranks may also be controlled by a motor carried by the vehicle if such a motor is at hand.

The rails or like supports are fixedly secured to the platforms or else are removable so as to allow them after reloading to be shipped together with the goods themselves with a view to use them in those railway stations which are not provided with the necessary slideways. In case the rails or like supports are removable, it may be of interest to connect the cooperating rails of a pair together so as to keep their spacing constant. This may be provided as shown in Fig. 1 by mere bars such as 8, which may of course be replaced by any other suitable system.

Obviously the spacing between the rails or like supports of two or more cooperating slideways is adjusted according to the circumstances of the case.

It is also of advantage to provide the ends of these rails or like supports with parts such as pins, wedges or the like adapted to prevent the goods from escaping over the ends of the said rails, for instance in turnings. In Fig. 5 I have shown by way of example an eccentric 9 which in the position shown passes underneath the level of the upper end of the slideway rollers and projects above said level when suitably rotated. In Fig. 6 the frame 5 does not carry directly the slideway rollers 4 which hang from an auxiliary frame 11 on which the jacks 6 act directly.

In order to allow an easy transfer of the goods, it is advisable to use a device such as a winch 12 secured to the goods-carrying vehicle. Around this winch two cables 13 and 13' are adapted to be wound, said cables passing over pulleys 14,14' also carried by the vehicle 1 and over the pulleys 15,15' carried by the platform 2 before returning to the case 16 to be transferred to which it is suitably secured at 17,17'. For instance the case may carry rings engaging hooks carried by the ends of the cables. Or else the cables may pass round the case. Thus by making the winch rotate, which may be effected by hand or through a motor, for instance the vehicle motor if such a motor is at hand, one man may transfer alone the case 16 from one platform to the other.

In those exceptional cases where it is not possible to bring the goods-carrying vehicle alongside of the other vehicle or platform, it is easy to dispose one or more supplemental rails perpendicularly or obliquely with reference to the vehicles to bridge the space separating the vehicles.

Preferably these supplemental rails or slideways bridging said space are not disposed in alinement with the slideways on the vehicles or loading stages, but preferably on the inner side thereof.

Figure 8:
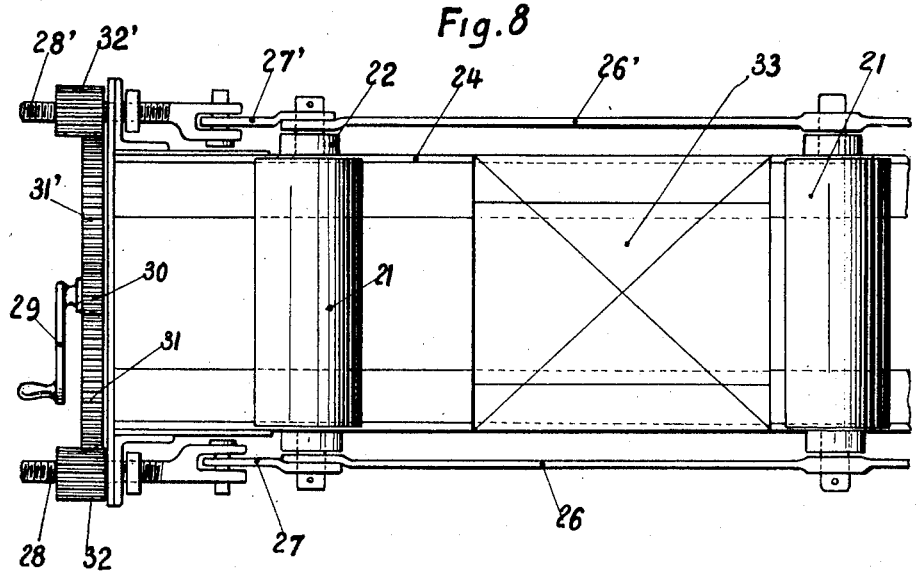
Fig. 8 is a view from above of same.

I have shown in Figs. 7 and 8 a modification of the invention.

The rollers 21 are mounted loose on axes carried by the free end of uprights 22 the foot of which is pivotally secured to the support 23 of the slideway. This support may be constituted for instance by two angle bars 24 separated by a wooden filling, this filling being recessed so as to afford a passage for the lower ends of the different uprights pivoting round the bolts 25 passing through the two angle bars 24. The axes of the different rollers are connected through two rods 26 and 26' secured to the outer ends of the said axes. These rods are controlled through the agency of short connecting rods 27 and 27' by the threaded rods 28 and 28'. These latter are controlled in their turn by the common crank 29 through the agency of the pinion 30, of the two pinions 31 and 31' and of two toothed bronze nuts 32 and 32' screwed over the threaded rods.

Between the rollers are disposed wooden wedges 33 the upper surface of which is slightly underneath the plane tangent to the top of the rollers in their raised position.

Obviously the actuation of the crank 29 deforms the link arrangement described whereby the rods 26 and 26' come into their lower position such as the one shown in dotted lines for which the uprights are inclined with reference to the vertical and the rollers carried thereby are entirely below the level of the upper surfaces of the wedges. The transferred goods resting on the rollers follow the latter in their downward motion until they are arrested by the wedges to which they are secured for transportation. Thus the rollers are not submitted to any stress nor to any deformation during the travel. On arriving the operation is reversed and the rollers raise again the goods when the crank is acted upon in the direction opposed to that used for the lowering of the goods, after which the latter are caused to slide over the rollers in their upper position so as to lead them on to another slideway carried by a loading stage or by another car or vehicle.

Figure 9:
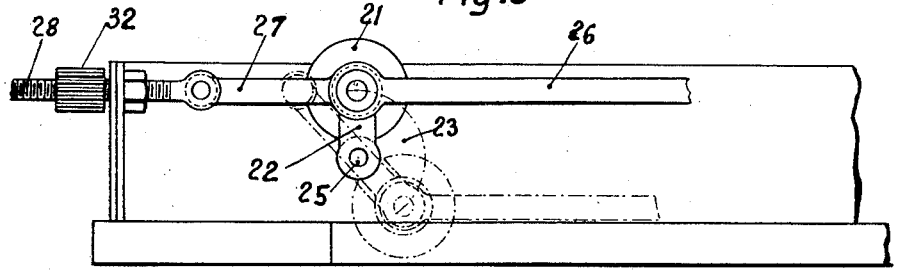
Fig. 9 is a modification of Fig. 7 wherein the rollers of the slideway collapse inside the vehicle platform.

On Fig. 9 the same elements have been given the same reference numbers. The special wedges 33 are omitted and the rollers are carried by uprights pivotally secured to the cross-bars of the freight car or railroad vehicle which constitute thus the support of the slideway.

What I claim is:

A slideway for transferring goods comprising a frame, links arranged in opposed pairs and having their lower ends pivotally connected to the frames so that the upper portions have vertical swinging movement with respect to the frame, rollers positioned between opposed pairs of links and having their trunnions journaled in the upper ends of the links, connecting rods arranged between the upper ends of the links and having their ends loosely engaged about the corresponding trunnions of adjacent rollers, and means operably engaged with the trunnions of one of the end rollers for raising and lowering all of the rollers and links with respect to the upper surface of the frame.

JEAN GONZALEZ DE ANDIA YRARRÁZAVAL.